May 16, 1961  F. J. HEYMANN  2,984,453
VIBRATION DAMPER FOR BLADING IN ELASTIC FLUID APPARATUS
Filed March 25, 1957
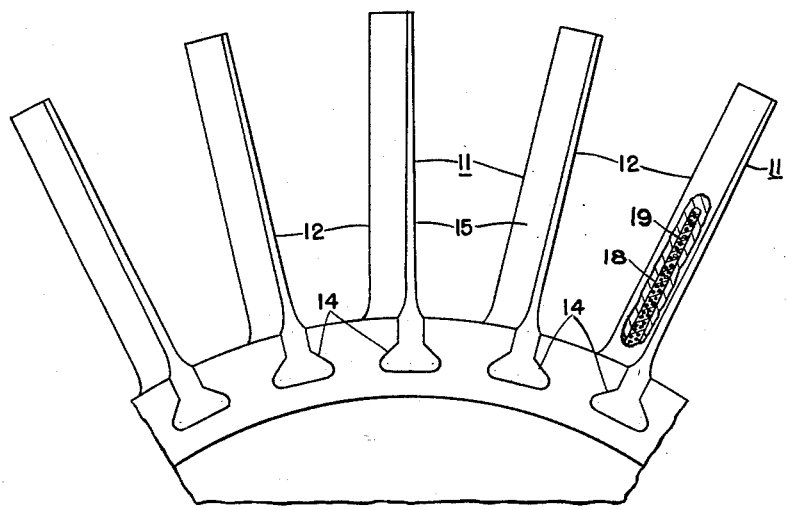
FIG.I.
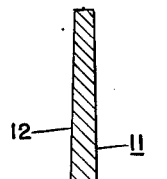
FIG.2.
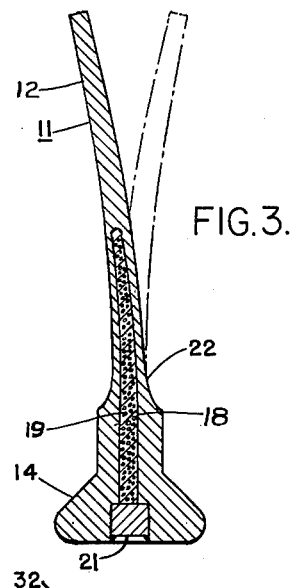
FIG.3.
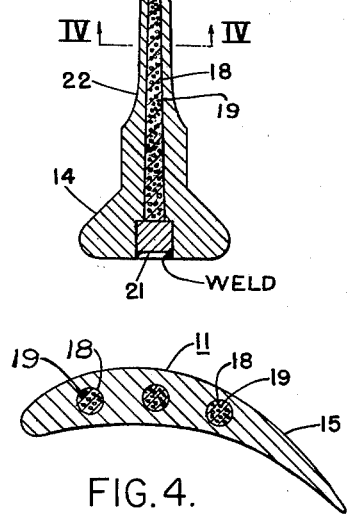
FIG.4.
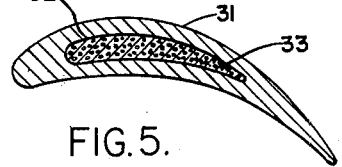
FIG.5.
INVENTOR
FRANK J. HEYMANN
BY Ralph T. French
ATTORNEY United States Patent Office 2,984,453
Patented May 16, 1961

2,984,453

VIBRATION DAMPER FOR BLADING IN ELASTIC FLUID APPARATUS

Frank J. Heymann, Media, Pa., assignor to Westinghouse Electric Corporation, East Pittsburgh, Pa., a corporation of Pennsylvania Filed Mar. 25, 1957, Ser. No. 648,423

6 Claims. (Cl. 253—77)

This invention relates to blade vibration dampers for elastic fluid apparatus, such as compressors and turbines, and has for a primary object to provide improved structure of this type.

Another object of the present invention is to provide an improved vibration damper which is fully enclosed within the blade, is of simple construction and may be easily assembled.

A further object of the invention is to provide an improved vibration damper for a blade wherein the dampening is effected by viscosity of a liquid confined therein.

In one embodiment of the present invention, the blade is provided with a cavity into which is placed a rod constructed of a porous material and impregnated with a liquid having a suitable viscosity. When the blade bends during vibration, some of the pores of the rod will be compressed and others dilated, forcing some of the liquid through adjacent pores. The viscous resistance of the liquid to this flow will provide the energy dissipation required for vibration damping.

The foregoing and other objects are effected by the invention as will be apparent from the following description and claims taken in connection with the accompanying drawings, forming a part of this application, in which:

Fig. 1 is a fragmentary side view of a rotor on which several blades are mounted, wherein a portion of one blade has been cut away to illustrate the improved damper of this invention;

Fig. 2 is an enlarged longitudinal sectional view of a blade and damper constructed in accordance with the present invention;

Fig. 3 is a sectional view similar to Fig. 2 but illustrating the blade during vibration;

Fig. 4 is a sectional view taken along the lines IV—IV of Fig. 2, looking in the direction indicated by the arrows but rotated 45 degrees; and, Fig. 5 is a sectional view similar to Fig. 4 but illustrating a modification.

Referring to the drawing in detail and in particular to Fig. 1, a portion of a typical turbine rotor is illustrated carrying a plurality of blades 11 of conventional form, which comprise part of one stage of an axial flow turbine. The blades 11 comprise vane portions 12 and root portions 14, the latter securing the blade to the rotor with the blade extending radially outwardly with respect to the axis of rotation of the rotor. The vane portion 12 includes a surface 15 defining an airfoil section.

Referring to Fig. 2, one of the blades 11 is illustrated as provided with a vibration damper comprising a longitudinally extending cavity, hole or chamber 18 in the vane portion 12. The cavity 18, is circular in cross section and an insert or rod 19 of similar cross section is housed therein. In the interest of clarity, the subsequent description is in terms of one damper comprising one cavity 18 and one rod 19, although as shown in Fig. 4, there actually are three such cavities and rods.

The rod 19 is constructed of a material having a multiplicity of interconnected pores or voids, such as sintered bronze. The material chosen for the rod is one which has a flexibility sufficient for the hereinafter described purpose. The rod 19 is so constructed that when placed within the cavity 18 it will fit tightly. This is accomplished by tapering the cavity 18 and the rod 19, as illustrated, and wedging the rod in the cavity, so that the surface of the rod 19 will be in intimate and contiguous contact with the surface defining the cavity 18. In operation, the outward centrifugal force upon the rod will aid in maintaining this relationship.

Either prior to or subsequent to insertion within the cavity 18, the rod 19 is impregnated with a dampening medium, that is, a liquid such as an oil which is as incompressible and as viscous as is practicable fills some of the pores of the rod. The rod 19 is normally retained and the cavity sealed by a plug 21 which is welded in place.

In operation, the vane portion 12 vibrates, one form of vibration, a vibration due to bending of the vane portion 12, being illustrattd in Fig. 3, wherein one extremity of movement is indicated by the solid lines and the opposite extremity by the dot-dash lines. The vibration causes the vane portion 12 to be strained in compression on one side and in tension on the other side. Since the rod has been tightly fitted within the cavity 18, it also will be strained in a similar manner. Referring to the position shown in solid lines in Fig. 3, the pores of the rod will be strained in compression on the left-hand side and in dilation on the right-hand side. When the blade bends to the right as illustrated in the dot-dash position, the strain will be reversed, that is, the side which was previously compressed is now dilated and the side which was dilated is now compressed. The material of which the rod 19 is constructed is such as to have enough flexibility to allow for these strain reversals. In response to this movement, the liquid in the porous rod attempts to flow between the interconnected pores and, due to the foregoing action, flows from left to right and then from right to left, but the liquid is retained in the cavity by the plug 21. Since the liquid impregnating the rod is as incompressible and viscous as is practical, a high resistance to this flow action will take place, and energy will be dissipated in overcoming this resistance, thereby dampening the vibration. The rate of energy dissipation, as in a hydraulic "dash-pot," is proportional to the squares of the amplitude of vibration and of the frequency of vibration or strain reversals, if the fluid is considered incompressible.

In order to obtain maximum effect from the foregoing strain reversals, a portion of the rod should be as near the surface 15 of the vane portion 12 as is practical, so that the pores may be highly compressed and dilated. Since the longitudinal portion of the vane portion 12 which incurs the greatest strain is a portion 22 adjacent the root, the length of the rod 19 need be only a portion of the length of the blade for effective damping.

The cavity 18, and hence the damper of the present invention as hereinbefore described, may be provided in one, some, or all of the blades, as may be desired. In addition, as illustrated in Fig. 4, a number of separate cavities 18, and hence a number of separate rods 19, may be placed within a single blade with their longitudinal axes substantially parallel to each other.

Referring to Fig. 5, a further embodiment is illustrated wherein the blade 31 is provided with a cavity 32 in which there is placed during the forging of the blade an insert or rod 33. The insert 33 is formed of granular material which is compacted or compressed, in situ, into a mass having a multiplicity of interconnected pores or passageways and, either before or after compressing, it is impregnated with a suitable damping medium. In this instance, the cavity 32 approximates the cross-sectional blade shape and may be sealed against leakage, in a manner similar to that shown in the previous embodiment. If desired, after the material is compressed, the blade may be heated to a temperature suitable for sintering the insert. In this event, the liquid impregnation is done after the sintering process is completed.

The insert 33 may be provided with a larger cross-sectional area than the total cross-sectional area of the several rods 19 which may be placed in the blade of the previous embodiment. Also, a greater portion of the insert is adjacent the surface of the blade, which results in the greatest compression or dilation of the pores. In other respects and in the mode of operation, the present embodiment is similar to that of the previous embodiment.

While the invention has been shown in several forms, it will be obvious to those skilled in the art that it is not so limited, but is susceptible of various other changes and modifications without departing from the spirit thereof.

What is claimed is:

1. In elastic fluid utilizing apparatus, a blade including a vane portion and a root portion, a rotor structure carrying said blade, said blade extending radially outwardly with respect to the axis of rotation of said rotor and having a tapered radially outwardly extending circular cavity, a tapered insert disposed within and tightly mating with the walls of said cavity, said cavity and said insert extending from said root portion into said vane portion, said insert being constructed of a material having a plurality of interconnected voids, a substantially incompressible liquid within some of said voids, and said cavity being sealed to confine said liquid therein.

2. In elastic fluid utilizing apparatus, a blade having a vane portion, said vane portion having a longitudinally extending chamber therein, a granular material confined within said chamber, said granular material tightly fitting said chamber and having a multiplicity of interconnected voids, a substantially incompressible liquid in some of the voids, and said chamber being sealed to confine said liquid therein.

3. In elastic fluid utilizing apparatus, a blade having a vane portion, said vane portion having a longitudinally extending chamber, an insert constructed of porous material and fitted tightly within said chamber, the pores of said material being interconnected, a substantially incompressible damping liquid in the pores of said insert, means for retaining said mass in said chamber, and said chamber being sealed to confine said liquid therein, whereby as the blade vibrates the liquid flows and viscous damping of blade vibration results.

4. In elastic fluid utilizing apparatus, a blade having a vane portion, said vane portion having a longitudinally extending chamber therein, a unitary mass of sintered granular material tightly disposed within said chamber, said mass having a multiplicity of interconnected pores, a substantially incompressible liquid impregnating said mass, means for retaining said mass in said chamber, and said chamber being sealed to confine said liquid therein.

5. In elastic fluid utilizing apparatus, a blade carried by a rotor, said blade having a vane portion extending radially outwardly with respect to the axis of rotation of the rotor; and means for damping the vibrations of said blade comprising a flexible insert tightly disposed within a longitudinal cavity formed in said vane portion, said insert being constructed of a material having a plurality of interconnected voids, a substantially incompressible liquid within a portion of the voids for damping the vibrations of said blade, and said chamber being sealed to confine said liquid therein.

6. In elastic fluid utilizing apparatus, a blade having a vane portion, said vane portion having a longitudinally-extending cavity, a longitudinally-extending rod tightly mating with the walls of said cavity, said rod being flexible along its longitudinal axis and constructed of a metallic material having a plurality of interconnected pores, a viscous liquid disposed within said pores, said cavity being sealed to confine said liquid therein, said blade being subject to forces exerted on it causing it to vibrate, the vibration of said blade causing the porous rod to flex, whereby some of its pores are compressed and others dilated, said compression and dilation of the pores making the liquid therein flow from said compressed pores to said dilated pores, and the resistance to flow of said liquid causing a dissipation of vibration energy.

References Cited in the file of this patent

UNITED STATES PATENTS

| 2,484,141 | Alex | Oct. 11, 1949 |
| 2,630,868 | Ellenberger | Mar. 10, 1953 |
| 2,636,399 | O'Connor | Apr. 28, 1953 |
| 2,646,920 | Butcher | July 28, 1953 |
| 2,648,388 | Haines | Aug. 11, 1953 |
| 2,665,881 | Smith | Jan. 12, 1954 |
| 2,809,802 | Suits | Oct. 15, 1957 |
| 2,828,940 | Newcomb | Apr. 1, 1958 |

FOREIGN PATENTS

| 1,024,218 | France | Jan. 7, 1953 |